E. RUEGGER.
AUTOMATIC LUBRICATOR.
APPLICATION FILED APR. 28, 1914.
1,152,847.
Patented Sept. 7, 1915.
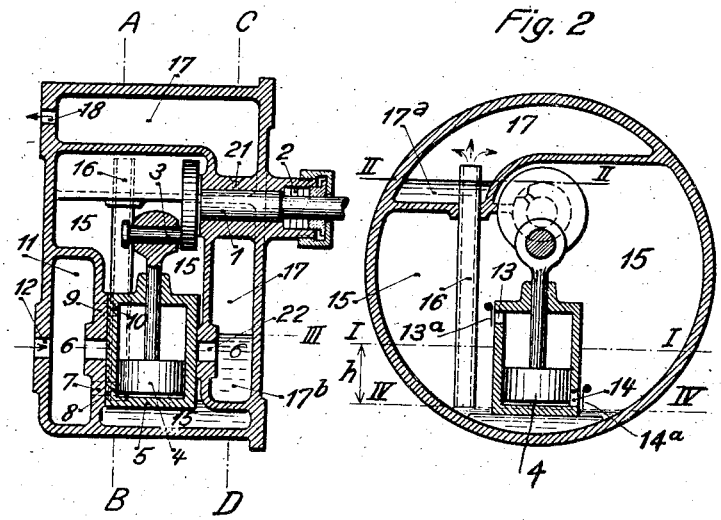
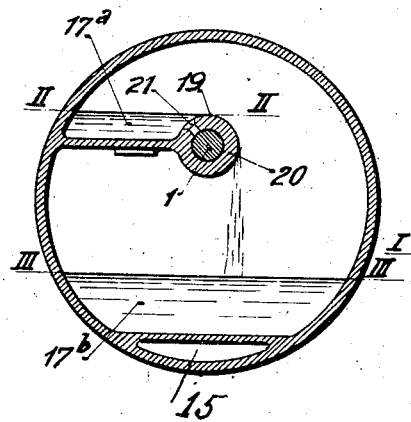
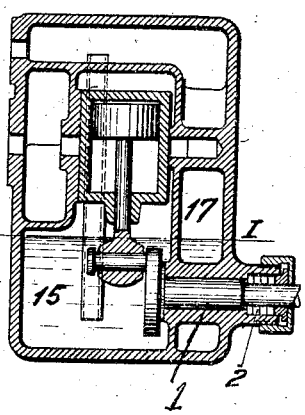
Witnesses
Inventor
Edward Ruegger
By his Attorneys
Edwards, Sager & Wooster 1,152,847.

UNITED STATES PATENT OFFICE.

EDUARD RUEGGER, OF ZURICH, SWITZERLAND, ASSIGNOR TO ESCHER, WYSS & CO., A CORPORATION OF SWITZERLAND.

AUTOMATIC LUBRICATOR.

Specification of Letters Patent. Patented Sept. 7, 1915.

Application filed April 28, 1914. Serial No. 834,881.

*To all whom it may concern:*

Be it known that I, EDUARD RUEGGER, a citizen of the Republic of Switzerland, residing at Zurich, Switzerland, have invented certain new and useful Improvements in Automatic Lubricators, of which the following is a full, clear, and exact specification.

This invention relates to lubricators, and has particular reference to an automatic circulating lubricating system particularly intended for compressors, but capable of being used in other relations where there is an available supply of compressed air.

The invention is herein shown applied to an air compressor wherein the lubricating oil is automatically elevated by the compressed air from a reservoir to a receiving chamber. In the receiving chamber, the oil separates from the air, permitting the compressed air to be distributed where desired, and the oil to feed by gravity to the various bearings. The elevated receiving chamber is herein shown as comprising two parts, the upper of which contains a fixed quantity of oil and overflows by gravity into a second part of the chamber, in which latter part is stored the excess oil in the system. From the various bearings, the oil returns by conduits to the reservoir, to be again elevated and circulated by the compressed air. Where air is referred to, it will be understood that any other compressed gas is included, since the feature of the invention is the elevation of oil from a reservoir to a distributing chamber directly by the compressed air.

In the accompanying drawings, Figure 1 is a sectional elevation of one form of the invention, Fig. 2 is a sectional elevation at right angles thereto on the line A—B of Fig. 1, Fig. 3 is a sectional elevation on the line C—D of Fig. 1, and Fig. 4 is an elevation in section similar to Fig. 1, of a slightly modified form.

1 represents a driving shaft having a stuffing box 2 and a crank pin 3 which actuates a piston 4 in an oscillating compressor cylinder 5, which is pivoted to the casing on trunnions 22, the axis of which is indicated by the line 6—6. The air inlet is through port 12 in the casing to chamber 11, thence by ports 7, 9 in the casing and ports 8, 10 in the cylinder 5 to opposite sides of the piston 4. These ports are properly opened and closed by the oscillation of the cylinder 5. The compressed air is discharged from above the piston 4 through cylinder port 13, which is closed against admission of air by a small flap valve 13ª, and air is discharged from the lower side of piston 4 through a similar port 14 controlled by a flap valve 14ª. These ports and valves open into a compressed air chamber 15, and the bottom of this chamber constitutes an oil reservoir as seen in Fig. 2. The chamber 15 is closed, and the only opening therefrom is by vertical pipe 16, which opens upwardly into a receiving and separating chamber 17. The lower end of the pipe 16 is so placed as to be above the oil level in chamber 15, and the compressed air discharged in chamber 15 passes upwardly through pipe 16 and simultaneously carries with it any oil above the lower end of pipe 16. That is, the mixed oil and air pass upwardly through pipe 16 as long as the oil is in contact with the lower end of pipe 16. Thus, a constant level of oil is maintained in chamber 15 as determined by the lower end of the pipe. The chamber 17 is composed of two parts 17ª and 17ᵇ. The upper part 17ª receives the oil which drops as soon as it leaves the tube 16, and forms a pool which feeds by gravity down into chamber 17ᵇ by flowing over the bearing of shaft 1. At the same time this oil passes through hole 21 and lubricates the shaft 1. The oil in chamber 17ᵇ lubricates the trunnions 22 of the compressor cylinder 5.

In assembling the machine, lubricating oil is poured in chamber 15, which accumulates around cylinder 5 and while the machine is standing still to about the height of line I—I in Fig. 2. Its level is equal to the distance $h$ above the lower opening of pipe 16. When the machine is started and produces sufficient air pressure in chamber 15 above the oil surface, the oil is thus forced up through pipe 16 into the upper chamber 17. It accumulates first at 17ª to the height II—II, and then flows over the upper edge of the bearing 20 as shown in Fig. 3. The level of oil III—III in chamber 17ᵇ is determined by the initial amount of oil poured in, or the amount of oil remaining if the machine has been run for some time. It will be observed that chambers 17ª and 17ᵇ are both parts of the same chamber. From the upper chamber 17ª, the oil will be carried by means of oil hole 21 to the journal of shaft 1, from which it will spread by gravity and centrifugal force to the edge of the crank disk and pin 3 and thence by gravity to the piston rod and piston. The flow of the oil may, of course, be aided by grooves and passages in the parts in any manner well known in the art. Also the oil can be led through suction slot 10 to the interior of the piston and cylinder. From all the bearings the oil runs to the gathering chamber 15, and the oil level is there maintained at the line IV—IV. As soon as sufficient oil accumulates to close the bottom of pipe 16, further compression of air by piston 4 pulls the oil along through pipe 16 to chamber 17 as before described, in which latter chamber the oil precipitates, because of its greater weight and separates from the air. The level in chamber 17ᵇ will vary with the amount of oil in the system, and consequently chamber 17ᵇ constitutes an oil reserve chamber. The machine may be run without the addition of oil as long as the level in chamber 17 is high enough to lubricate pivots 22.

It is to be noted that the pressure in chamber 15 is not affected by the head of pipe 16, since in normal operation, the pipe does not contain a homogeneous column of liquid, but simply an atomized mixture of oil and air, which has a pulsating movement due to the reciprocating piston 4. The oil is thus pulled along by the air pressure.

In Fig. 4, the driving crank shaft and cylinder are inverted, so that while the machine is at rest the liquid level is higher than the crank bearing and the stuffing box, and prevents escape of air. Also, there is a slight head which increases the lubrication. In this form, the liquid levels in chambers 15, 17ª and 17ᵇ correspond to those previously described.

Various modifications and changes in the specific construction herein shown may be made without departing from the scope of the appended claims, it being understood that the invention in its broad aspect is not restricted to the particular form of compressor herein shown, as the oil circulating system can be operated by any other suitable source of compressed air.

An advantage of the present arrangement resides in its compactness, and simplicity of parts, the oil being automatically pumped by air pressure without additional oil pumps, valves, or the like.

Having thus described my invention, what I declare as new and desire to secure by Letters Patent of the United States, is:—

1. The combination with a compressor, of a discharge chamber containing an oil reservoir, a second chamber above said first chamber and oil reservoir, and oil and gas conveying means opening vertically between the top and bottom surfaces of said first chamber connecting said chambers.

2. The combination with a compressor, of a discharge chamber containing an oil reservoir, a second chamber above said first chamber and oil reservoir, means opening vertically between the top and bottom surfaces of said first chamber for conveying oil and gas from said first to said second chamber.

3. The combination with a compressor, of a casing surrounding the same and comprising a lower oil reservoir, an upper separating chamber and an oil and gas conveying means connecting said chambers.

4. The combination with a source of compressed air, of an oil reservoir subject to said pressure, means for supplying oil to said reservoir, a separating chamber above said reservoir, and a pipe connecting said reservoir and said chamber and opening into said reservoir above the bottom and below the top thereof.

5. The combination with a compressor, of a compression chamber connected therewith and containing an oil reservoir, an upper chamber receiving oil from said reservoir and allowing said oil to flow by gravity over parts to be lubricated.

6. The combination with a source of compressed air, of an oil reservoir subject to said pressure, means for supplying oil to said reservoir, a constant level separating chamber above said reservoir, a pipe connecting said reservoir and said chamber and opening into said reservoir and said chamber above the respective bottoms thereof.

7. The combination with a source of compressed air, of an oil reservoir subject to said pressure, means for supplying oil to said reservoir, a constant level separating chamber above said reservoir, a pipe connecting said reservoir and said chamber and opening into said reservoir above the bottom thereof, and means for maintaining the oil level in said chamber below the top of said pipe.

8. The combination with a source of compressed air, of an oil reservoir subject to said pressure, means for supplying oil to said reservoir, a constant level separating chamber above said reservoir, an oil and air carrying pipe connecting said reservoir and said chamber, and means for separately discharging oil and compressed air from said chamber.

9. The combination with an oil reservoir, and means for applying pressure thereto, of an oil feeding pipe extending upwardly from said reservoir, a separating chamber containing the upper end of said pipe, and storing excess oil, a bearing connected to be supplied by gravity from said chamber, and to discharge into said first reservoir.

10. The combination with a bearing, of a circulating oil system comprising a constant level reservoir, a pipe leading upwardly therefrom, a chamber connected to said pipe, means for lifting oil through said pipe by air pressure, a bearing connected to be supplied by gravity from said chamber, and to discharge into said constant level reservoir.

11. The combination with a compressor, of a compression chamber containing an oil reservoir for oil under pressure, an upper chamber and a conduit connecting the two chambers and dipping downwardly into the reservoir but out of contact therewith.

12. The combination with an air compressor, of lubricating means comprising an oil reservoir open to pressure from said compressor, an upwardly extending air and oil pipe leading therefrom, a two part chamber for separating oil and air communicating with the upper end of said pipe, one part having a constant level, and the other part being supplied from said first part and storing excess oil, an oil passage from said chamber to a bearing or bearings of said compressor.

In testimony whereof I affix my signature, in presence of two witnesses.

EDUARD RUEGGER.

Witnesses:
    HANS GUYN-BUNDER,
    CARL GUBEN.